United States Patent [19]

Dewhurst et al.

[11] Patent Number: 5,317,075
[45] Date of Patent: May 31, 1994

[54] HYDROXYL CONTAINING QUATERNARY AMMONIUM SALTS OF FATTY ACIDS AS INTERNAL MOLD RELEASE COMPOSITIONS

[75] Inventors: John E. Dewhurst; Ronald M. Pearlstein, both of Macungie, Pa.; Thomas W. Panunto, Yokahamo, Japan; Reinaldo M. Machado, Allentown, Pa.

[73] Assignee: Air Products and Chemicals, Inc., Allentown, Pa.

[21] Appl. No.: 992,517

[22] Filed: Dec. 16, 1992

[51] Int. Cl.$^5$ ............................................. C08G 18/00
[52] U.S. Cl. ........................................ 528/44; 528/48; 528/50; 528/53; 528/68; 528/76; 521/129; 521/130; 521/163; 521/170; 521/172; 106/143; 106/287.24
[58] Field of Search ............ 528/44, 48, 50, 53, 528/68, 76; 521/129, 130, 163, 170, 172; 124/724, 773; 106/243, 287.24

[56] References Cited

U.S. PATENT DOCUMENTS

| | | | |
|---|---|---|---|
| 3,726,952 | 4/1973 | Boden et al. | 264/43 |
| 4,040,992 | 8/1977 | Bechara et al. | 260/2.5 |
| 4,076,695 | 2/1978 | Keil | 260/77.5 |
| 4,098,731 | 7/1978 | Bonin et al. | 521/51 |
| 4,220,727 | 9/1980 | Godlewski | 521/110 |
| 4,886,838 | 12/1989 | Dewhurst et al. | 521/117 |
| 4,897,428 | 1/1990 | Dewhurst et al. | 521/115 |
| 5,019,600 | 5/1991 | Dewhurst et al. | 521/117 |
| 5,076,989 | 12/1991 | Dewhurst et al. | 156/38.22 |
| 5,158,607 | 10/1992 | Mafoti et al. | 528/53 |
| 5,211,749 | 5/1993 | Dewhurst et al. | 156/38.24 |

*Primary Examiner*—John Kight, III
*Assistant Examiner*—Due Truong
*Attorney, Agent, or Firm*—Michael Leach; James C. Simmons; Russell L. Brewer

[57] ABSTRACT

In an active hydrogen-containing B-side composition for reaction with a polyisocyanate-containing A-side composition to make a polyurethane or polyurethane/urea elastomer by reaction injected molding, the improvement which comprises a mold release composition which is the reaction product of a $C_{12}$–$C_{36}$ fatty acid, a tertiary amine having at least one $C_{12}$–$C_{18}$ alkyl substituent and a $C_2$–$C_{21}$ reactive epoxide.

20 Claims, No Drawings

HYDROXYL CONTAINING QUATERNARY AMMONIUM SALTS OF FATTY ACIDS AS INTERNAL MOLD RELEASE COMPOSITIONS

FIELD OF THE INVENTION

The present invention relates to internal mold release compositions for use in reaction injection molding of polyurethane articles.

BACKGROUND OF THE INVENTION

Reaction injection molding (RIM) is a versatile process by which elastomeric and thermoset parts can be fabricated. The RIM process involves high pressure impingement mixing of a polyisocyanate stream (A-side) and an active hydrogen containing, isocyanate-reactive stream (B-side) followed by immediate injection into the closed mold. The primary appeal of this process lies in its inherently high productivity. One factor which limits productivity, however, is the necessity to spray the molds with external mold release prior to each injection. This is a time consuming task and often has a negative environmental impact. This difficulty can be overcome by the incorporation of an internal release agent into the formulation via one of the two streams which significantly increases the number of molding cycles which can be accomplished between external mold release sprayings. While the internal mold release (IMR) approach is commercially applied, there remain significant shortcomings in the currently available internal mold release systems. The amine-solubilized metallic soaps, which are most commonly used in this application, have been implicated in reduced flowability and increased heat sags for the RIM elastomers in which they are used. Furthermore, the high melting points and limited solubilities of the metallic soaps makes them prone to precipitation in the RIM processing equipment, necessitating regular replacement of the piping.

Liquid IMR agents, particularly silicone fluids, have been investigated previously. Unfunctionalized polydimethylsiloxane fluids are unacceptable because they destabilize air nucleation on the B-side and cause painting problems. Carboxylic acid functionalized silicones have been described which alleviate some of the above limitations (U.S. Pat. No. 4,076,695), but cause serious reactivity problems with the polyurethane formation. Salts formed by the neutralization of tertiary amines with fatty acids have been disclosed (U.S. Pat. No. 4,098,731) as IMR for integral-skin urethane foams. Similarly, salts of primary amines are disclosed in U.S. Pat. No. 3,726,952. The equilibrium concentration of free carboxylic acids in such a salt of a relatively weak acid with a relatively weak basic amine is sufficient to cause reactivity problems similar to those observed in the acidic silicones.

U.S. Pat. No. 4,220,727 discloses aralkyl quaternary aninonium salts as release agents. All of the examples are chloride salts containing at least one "phenyl stearyl" group.

U.S. Pat. No. 4,040,992 discloses the use of N-hydroxyalkyl quaternary ammonium carbonylate salts as catalysts in the production of polyisocyanurates and polyurethanes. Among the exemplary preferred catalysts are N-hydroxypropyl trimethyl ammonium salts of carboxylic acids such as those of formic and acetic acids and of fatty acids such as hexanoic and octanoic acids and the like.

SUMMARY OF THE INVENTION

The present invention is directed to a method for making a polyurethane or polyurethane/urea elastomer in which a reactive mixture is formed in a mold cavity and cured. The reactive mixture contains polyol, an organic polyisocyanate, a urethane catalyst, optionally a diol and/or diamine chain extender, and an internal mold release (IMR) additive. The present invention provides as the mold release additive the reaction product of a $C_{12}$–$C_{36}$ fatty acid, a tertiary amine having at least one $C_{12}$–$C_{18}$ alkyl substituent, and a reactive $C_2$–$C_{21}$ epoxide.

Another embodiment of the invention is a polyol-containing B-side composition for reaction with a polyisocyanate-containing A-side composition. The B-side composition consists essentially of a polyol, urethane catalyst, the IMR additive, and optionally a diol and/or diamine chain extender and silicone surfactant.

The resulting IMR compositions are either oily liquids or waxes with relatively low melting points which can be dissolved or dispersed into the B-side of a polyurethane or polyurethane/urea RIM formulation.

DETAILED DESCRIPTION OF THE INVENTION

The present invention is directed to an internal mold release (IMR) composition for use in a molding process, an isocyanate-reactive composition containing the IMR agent, and the use of the IMR agent in a molding process.

The internal mold release composition of the present invention preferably comprises the reaction product of a substantially stoichiometric mixture of a $C_{12}$–$C_{36}$ fatty acid, a tertiary amine containing at least one $C_{12}$–$C_{18}$ alkyl substituent, and a $C_2$–$C_{21}$ reactive epoxide. This reaction product comprises a mixture of the hydroxy-functional quaternary ammonium salt of the fatty acid with varying amounts of free tertiary amine and the hydroxy-functional ester of the fatty acid with the epoxide.

The fatty acid may be a mono- or dicarboxylic acid having from about 12 to 36 carbon atoms such as, for example, lauric, myristic, linoleic, linolenic and montanic acids and preferably is a monocarboxylic acid with 16 to 18 carbon atoms such as palmitic, stearic or oleic acids.

The tertiary amine contains at least one higher hydrocarbon substituent, preferably two such substituents, having 12 to 18 carbon atoms each. Suitable tertiary amines would have the formula

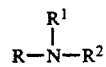

where:

R is $C_1$–$C_4$ alkyl group such as methyl or ethyl, $R^1$ is a $C_{12}$–$C_{18}$ hydrocarbyl group such as lauryl, myristyl, cetyl or stearyl, and $R^2$ is R or $R^1$.

Although $C_2$–$C_{21}$ reactive epoxides can be used including mono and diepoxides, it is preferred to use propylene oxide or the monoglycidyl ether of a higher alcohol containing 12–18 carbon atoms. Suitable higher alcohols include lauryl, myristyl, cetyl, and stearyl alcohols.

The internal mold release compositions may generally be prepared by heating a mixture of the amine, acid and epoxide together at $\geq 70°$ C. until the epoxide band at 916 cm$^{-1}$ is absent from the infrared spectrum. Although the components may be reacted in various relative amounts, it is preferred to use substantially stoichiometric amounts.

The mold release compositions resulting form the reaction of the three components are suitable for use with either flexible or rigid, optionally cellular, polyurethane or polyurethane/urea elastomers. The molded articles may possess various combinations of these properties such as rigid, non-cellular elastomers or flexible, cellular products for use, for example, as shoe soles.

The mold release composition is used in an amount sufficient to effect release of the molded article from the mold surfaces. A suitable amount would be 0.5 to 10 wt %, preferably 3 to 5 wt %, based on the B-side, or isocyanate-reactive, composition comprising at least one high molecular weight active hydrogen containing compound, amine and/or metallic urethane catalyst, optionally a diol or diamine chain extender, and silicone surfactant. The reaction mixture is preferably processed at an isocyanate index of from 70 to 130.

Suitable polyisocyanates for use in the present invention are aliphatic, cycloaliphatic, araliphatic and aromatic polyisocyanates which are well known in the art. Specific examples include ethylene diisocyanate, 1,4-tetramethylene diisocyanate, 1,6-hexamethylene diisocyanate, cyclohexane-1,3- and 1,4-diisocyanates and isophorone diisocyanate. Typical aromatic polyisocyanates include phenylene diisocyanate, toluene diisocyanate and 4,4'-diphenylmethane diisocyanate. Especially suitable are the 2,4- and 2,6-toluene diisocyanates individually or together as their commercially available mixtures. Other especially suitable mixtures of diisocyanates are those known commercially as "crude MDI" also known as "PAPI", which contain about 60% of 4,4'-diphenylmethane diisocyanate along with other isoineric analogous higher polyisocyanates. Also suitable are prepolymers of these polyisocyanates comprising a partially prereacted mixture of polyiso-cyanate and polyether or polyester polyols disclosed hereinafter.

The polyether polyols useful in the invention include primary and secondary hydroxyl-terminated polyether polyols greater than 500 average molecular weight having from 2 to 6 functionality, preferably from 2 to 3, and a hydroxyl equivalent weight of from 250 to about 2500. Mixtures of polyether polyors may be used.

The polyether polyols are made from an appropriate initiator to which lower alkylene oxides such as ethylene oxide, propylene oxide, butylene oxide or mixtures thereof are added resulting in hydroxyl-terminated polyors. When two or more oxides are used, they may be present as random mixtures or as blocks of one or the other polyether. Thus the polyalkylene ether polyols include the poly(alkylene oxide) polymers, such as poly(ethylene oxide) and poly(propylene oxide) polymers and copolymers with a terminal hydroxyl group derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and tri-functional materials and/or different molecular weight or different chemical composition materials may be used.

Useful polyester polyols include those produced by reacting a carboxylic acid with an excess of a diol; for example, adipic acid with ethylene glycol or butane diol, or a lactone with an excess of a diol, such as caprolactone and propylene glycol.

Illustrative of suitable hydroxyl group-containing chain extenders are ethylene glycol, propylene glycol, butane diols, 1,6-hexane diol, diethylene glycol, triethylene glycol, tetraethylene glycol, dipropylene glycol, tripropylene glycol, glycerol and trimethylol propane.

The aromatic diamine chain extenders useful in this invention include for example, 1-methyl-3,5-diethyl-2,4-diaminobenzene; 1-methyl-3,5-diethyl-2,6-diaminobenzene (both these materials are also called diethyl toluenediamine or DETDA); 1,3,5-triethyl-2,6-diaminobenzene; 2,4-dimethyl-6-t-butyl-3,5-diaminobenzene; 3,5,3',5'-tetraethyl-4,41-diaminodiphenylmethane; 1-methyl-3-t-butyl-2,4-diaminobenzene; 1-methyl-5-t-butyl-2,6-diaminobenzene (both these materials are also called t-butyl toluenediamine or TBTDA) and the like. Particularly preferred aromatic diamine chain extenders are DETDA and TBTDA. It is within the scope of the invention to include some aliphatic chain extender materials as described in U.S. Pat. Nos. 4,246,363 and 4,269,945.

Urethane catalysts include amine and tin catalysts well known in the art such as for example, triethylenediamine and dibutyltin dilaurate. Suitable amounts of catalyst may range from about 0.025 to 0.3 parts, preferably 0.05 to 0.2 parts, per 100 parts per weight polyol in the elastomer composition.

Other conventional ingredients may be employed as needed, such as, for example, foam stabilizers, also known as silicone oils or surfactants and reinforcing materials.

The compositions according to the present invention may be molded using conventional processing techniques and are especially suited for processing by the RIM process. In general, two separate streams are intimately mixed and subsequently injected into a suitable mold, although it is possible to use more than two streams. The first stream contains the polyisocyanate component, while the second stream contains the polyol component, urethane catalyst, chain extender, the internal mold release composition and any other additive which is to be included.

In the following Examples the adhesion test which was used to quantify the performance of the various IMR candidates was based on the ASTM standard method D429B, "90° Stripping Test". The adhesion test procedure was the following:

The mold, which has six wells with dimensions 6×1×5/16 inch (15.24×2.54×0.79 cm), is coated with external mold release. A steel coupon with dimensions 1×2.5 inch (2.54×6.35 cm) is thoroughly cleaned of corrosion and contamination with a Scotch-brite pad, then polished with grade 00 steel wool. The coupon is then rinsed under a stream of toluene and oven-dried. Both ends of the coupon are masked with pieces of ¾ inch (1.9 cm) transparent tape to provide a 1 in$^2$ (6.45 cm²) bare steel surface for bonding, then placed in one end of the mold. Typically, five coupons are prepared simultaneously in this manner. The masked coupons in the mold are then tempered in a 70° C. oven.

A 2:1 (w/w) curative mixture is prepared with Multranol 3901 polyol and XCE-89 (t-butyl toluenediamines) chain extender. The T-12 catalyst is then added at a concentration of 0.1% by weight. For the test, 53.8 g of this blend is weighed into a 12 oz (355 ml) paper cup and heated to 70° C. The IMR (2.7g) is then blended with the curative mixture. The isocyanate-terminated prepolymer, Airthane® PPT-95A (150 g) prepolymer, is then weighed into the resulting mixture.

The polyurethane/urea mixture is blended for 10 seconds with a Dispersator (Premier Mill Corp.) fitted with a 1 inch (2.54 cm) duplex head, then immediately poured into the prepared mold. A woven backing with 0.25 inch (0.64 cm) spacings is placed on top of the cast mixture to prevent elongation of the part during testing. The casting is cured at 70° C. for 30 min and carefully demolded. The masked regions of the coupon are gently released from the elastomers providing a means of connecting the coupon to the Instron tester. Any elastomer which laps over the side of the coupon is trinvned with a razor-knife. The opposite end of the casting is attached to the upper pneumatic jaw of the Instron. The distance between the coupon and the upper jaw of the Instron is set to 3.5 inch (8.9 cm). A cross-head speed of 0.2 inch/min (0.51 cm/min) is used during the force vs displacement measurement. The area under the curve and the peak force are noted. The area under the curve is reported as "Release Energy" (lb) in Table 1.

EXAMPLE 1

A 500 ml 3-necked round-bottomed flask was charged with 90.6 g of dimethyl oleylamine (Anneen DMOD, 0.302 equivalents), 81.3 g of stearic acid (Aldrich, 0.286 equivalents), and 83.5 g of the glycidyl ether of lauryl alcohol (Epodil 748, 0.290 equivalents). The mixture was heated with stirring and held at 70° C. for 24 hours. When cool, the product was a yellowish waxy solid which completed melting at 50° C. (by DSC) with a heat of fusion of 56.6 J/g.

EXAMPLE 2

A 500 ml 3-necked round-bottomed flask was charged with 85.2 g of dimethyl laurylamine (Armeen DM12D, 0.332 equivalents), 85.5 g of dimer acid (Empol 1010, 0.302 equivalents), and 83.5 g of the glycidyl ether of lauryl alcohol (Epodil 748, 0.302 equivalents). The mixture was heated with stirring and held at 70° C. for 24 hours. When cool, the product was a water-white grease which completed melting at 59° C. (by DSC) with a heat of fusion of 28.3 J/g.

EXAMPLE 3

A 500 ml 3-necked round-bottomed flask was charged with 98.5 g of dimethyl oleylamine (Armeen DMOD, 0.328 equivalents), 119.5 g of montanic acid (Hoechst Wax S, 0.298 equivalents), and 41.0 g of the bis-glycidyl ether of neopentyl glycol (Epodil 749, 0.298 equivalents). The mixture was heated with stirring and held at 70° C. for 24.5 hours. When cool, the product was a brown waxy solid which completed melting at 84° C. (by DSC) with a heat of fusion of 90.1 J/g.

EXAMPLE 4

A 500 ml, 3-necked round bottom flask was charged with 100.2 g of dimethyl stearylamine (Armeen DM18D, 0.329 eq), 80.7 g of oleic acid (Emery Emersol 233-LL, 0.286 eq), and 82.2 g of the glycidyl ether of lauryl alcohol (Epodil 748, 0.286 eq). The mixture was heated to 70°-80° C. with stirring for 24 hr. When cool, the product was a soft, off-white wax with a melting point of 52.2° C. (by DSC) and a heat of fusion of 55.03 J/g.

EXAMPLE 5

A 500 ml, 3-necked round bottom flask was charged with 105.1 g of dimethyl stearylamine (Armeen DM18D, 0.345 eq), 97.6 g of dimer acid (Emery Empol 1010, 0.345 eq), and 47.4 g of the bis-glycidyl ether of neopentyl glycol (Epodil 749, 0.345 eq). The mixture was heated to 70°-80° C. with stirring for 24 hr. When cool, the product was a viscous yellow liquid with a melting point of 19.9° C. (by DSC) and a heat of fusion of 37.84 J/g.

EXAMPLE 6

A 1-quart tin-coated can was charged with 91.38 g of dimethyl stearylamine (Armeen DM18D, 0.300 eq), 114.48 g of montanic acid (Hoechst Wax S, 0.285 eq) and 48.58 g of bis-glycidyl ether of bisphenol A (Epon 828, 0.285 eq). The mixture was heated on a hot plate with stirring until a homogenous solution was fanned (approximately 5 min at 80° C.), then the reaction was completed in an oven at 72° C. for 23.5 hr. The resulting product was a brown hard solid which could be polverized with a mortar and pestle. This material completely melted at 76.9° C. and had a heat of fusion of approximately 90 J/g.

EXAMPLE 7

A 1-quart tin-coated can was charged with 90.25 g of dimethyl laurylamine (Armeen DM12D, 0.351 equivalents), 99.959 of stearic acid (Aldrich, 0.352 equivalents) and 59.86 g of the bis-glycidyl ether of bisphenol A (Epon 828, 0.352 equivalents). The mixture was heated on a hot plate with stirring at 71° C. for 30 minutes at which time a homogeneous solution was obtained. The reaction was completed in an oven at 72° C. for 23 hours, yielding a yellow viscous oil. DSC indicated that the material was completely melted at 23.5° C. and had a total heat of fusion of 27 J/g.

EXAMPLE 8

A 1-quart tin-coated can was charged with 114.65 g of dimethyl oleyl amine (Armeen DMOD, 0.382 equivalents), 93.92 g of dimer acid (Empol 1010, 0.332 equivalents) and 56.51g of the bis-glycidyl ether of bisphenol A (Epon 828, 0.332 equivalents). The mixture was stirred and then placed in an oven at 72° C. for 24 hours. Progress of the reaction was followed by monitoring the infrared absorption at 913 cm$^{-1}$, which indicated approximately 80% conversion after 3 hours. The resulting yellow product displayed viscoelastic properties. DSC indicated that the material was completely melted at −6.7° C., and had a combined heat of fusion of approximately 2 J/g.

EXAMPLE 9

A 1-pint tin-coated can was charged with 72.08 g of oleic acid (Emery Emersol 233-LL, 0.256 equivalents), and 43.43 g of the bis-glycidyl ether of bisphenol-A (Epon 828, 0.255 equivalents). To the resulting immiscible mixture was added 148.05 g of molten distearyl methylamine (Anneen M2HT, 0.281 equivalents). The reaction mass was stirred and heated to 75° C. for 3 hours at which time a homogeneous yellow solution was obtained. The reaction was completed in an oven at 72° C. for 22 hours, yielding a pale yellow soft wax. DSC indicated that the material was completely melted at 35.6° C., and had a combined heat of fusion of approximately 46 J/g.

EXAMPLE 10

Dimethyl stearylamine (Armeen DM18D; 322.1 g) and stearic acid (317.4 g) were charged into the autoclave reactor. The reactor was then pressurized with 15 psig of $N_2$. The reaction mixture was then heated to 80° C. To the reaction mass, a stoichiometric quantity of propylene oxide (61.4 g) was pumped in over a period of 60 minutes. A sufficient amount of cooling was applied to maintain the reaction mass at a constant temperature as the reaction proceeded. A pressure increase was noted in the reactor during the PO addition as its vaporization occurred. The reaction was determined to be complete when no further exotherm from the reaction could be detected and the pressure had dropped to a constant level. The resulting product was completely melted at 60° C. with a heat of fusion of 150 J/g.

EXAMPLE 11

A 500 ml, 3-necked round bottom flask was charged with 99.7 g of dimethyl laurylamine (Armeen DM12D, 0.389 eq), 104 g of oleic acid (Emery Emersol 233-LL, 0.370 eq) and 50.4 g of the bis-glycidyl ether of neopentyl glycol (Epodil 749, 0.370 eq). The mixture was heated to 70°-80° C. with stirring for 24 hr. When cool, the product was a light brown viscous liquid with a melting point of $-26.7°$ C. (by DSC) and a heat of fusion of 17.67 J/g.

EXAMPLE 12

A 500 ml, 3-necked round bottom flask was charged with 160 g of distearyl methylamine (Armeen M2HT, 0.304 eq), 75 g of stearic acid (Aldrich 95%, 0.264 eq) and 37.1 g of the bis-glycidyl ether of neopentyl glycol (Epodil 749, 0.270 eq). The mixture was heated to 70°-80° C. with stirring for 24 hr. When cool, the product was an off-white wax with a melting point of 54.2° C. (by DSC) and a heat of fusion of 45.6 J/g.

EXAMPLE 13

A 500 ml, 3-necked round bottom flask was charged with 108.6 g of distearyl methylamine (Armeen M2HT, 0.206 eq), 82.6 g of montanic acid (Hoechst Wax S, 0.206 eq) and 59.2 g of the glycidyl ether of lauryl alcohol (Epodil 748, 0.206 eq). The mixture was heated to 70°-80° C. with stirring for 24 hr. When cool, the product was a wax with a melting point of 52.5° C. (by DSC) and a heat of fusion of 117.5 J/g.

EXAMPLE 14

Followed the procedure of Example 10 except the amine was changed to dimethyl oleylamine, and the acid to oleic acid. The product was a liquid with a melting point of 9.7° C. (by DSC) and a heat of fusion of 20.4 J/g.

EXAMPLE 15

Followed the procedure of Example 10 except the amine was changed to dimethyl laurylamine, and the acid to montanic acid. The melting point of the product was 51.5° C. (by DSC) and a heat of fusion of 84 J/g.

EXAMPLE 16

Followed the procedure of Example 10 except the amine was changed to distearyl methylamine, and the acid to dimer acid. The melting point of the product was 34.3° C. (by DSC) and a heat of fusion of 112.6 J/g.

EXAMPLE 17

Followed the procedure of Example 10 except the amine was changed to distearyl methylamine, and the epoxide to Epodil 748 epoxide.

The following Table 1 shows the release evaluation results (in lbs) with fatty quaternary salts made from monoepoxides. All of the examples show better release than the control with no IMR.

TABLE 1

| Example | Amine | Acid | Epoxide | Release Energy |
|---|---|---|---|---|
| 13 | Distearyl methyl | Montanic | Glycidyl ether of lauryl alcohol | 0.9 ± 0.1 |
| 1 | Dimethyl oleyl | Stearic | Glycidyl ether of lauryl alcohol | 1.0 ± 0.3 |
| 16 | Distearyl methyl | Dimer | Propylene oxide | 1.0 ± 0.3 |
| 17 | Distearyl methyl | Stearic | Glycidyl ether of lauryl alcohol | 1.1 ± 0.4 |
| 14 | Dimethyl oleyl | Oleic | Propylene oxide | 1.2 ± 0.6 |
| 10 | Dimethyl stearyl | Stearic | Propylene oxide | 1.4 ± 0.3 |
| 4 | Dimethyl stearyl | Oleic | Glycidyl ether of lauryl alcohol | 1.8 ± 0.2 |
| 15 | Dimethyl lauryl | Montanic | Propylene oxide | 1.9 ± 0.4 |
| 2 | Dimethyl lauryl | Dimer | Glycidyl ether of lauryl alcohol | 2.2 ± 0.4 |
| CONTROL | | NO IMR | | 2.7 ± 0.1 |

Table 2 shows the results with quaternary salts made from diepoxides. While it is possible to make effective release agents from these epoxides as demonstrated by Examples 7, 11 and 12, it is preferred to use monoepoxides.

TABLE 2

| Example | Amine | Acid | Epoxide | Release Energy |
|---|---|---|---|---|
| 12 | Distearyl methyl | Stearic | Bis-glycidyl ether of neopentyl glycol | 1.4 ± 0.3 |
| 7 | Dimethyl lauryl | Stearic | Bis-glycidyl ether of bisphenol A | 1.4 ± 0.4 |
| 11 | Dimethyl lauryl | Oleic | Bis-glycidyl ether of neopentyl glycol | 1.8 ± 0.4 |
| CONTROL | | NO IMR | | 2.7 ± 0.1 |
| 9 | Distearyl methyl | Oleic | Bis-glycidyl ether of bisphenol A | 2.8 ± 0.4 |
| 8 | Dimethyl oleyl | Dimer | Bis-glycidyl ether of bisphenol A | 3.2 ± 1.1 |
| 5 | Dimethyl stearyl | Dimer | Bis-glycidyl ether of neopentyl glycol | 3.4 ± 0.6 |
| 6 | Dimethyl stearyl | Montanic | Bis-glycidyl ether of bisphenol A | 3.7 ± 1.0 |
| 3 | Dimethyl oleyl | Montanic | Bis-glycidyl ether of neopentyl | 5.3 ± 1.6 |

EXAMPLE 18

A 2000 ml, 3-necked round bottom flask was charged with 224 g of triethylenediamine (DABCO® crystal, 2.0 eq) and 568 g of stearic acid (Aldrich 95%, 2.0 eq). This mixture was heated with stirring to 68° C. after which 575 g of the glycidyl ether of lauryl alcohol (Epodil 748, 2.0 eq) was added dropwise over the course of 3 hours. During the course of addition the mixture became viscous and the temperature was to 100°–110° C. The product was a hard, off-white wax.

EXAMPLE 19

Two IMR compositions were evaluated under realistic conditions by using an EMB PU-2 RIM machine. The polyurethane/urea formulation used Multranol 9143 polyol, XCE-89 chain-extender, Dabco® T-12 and Dabco 33 LV® catalysts in the "B"-side. The IMR composition was added as a 28% solution in poly bd R-45HT resin which made up 7.2% of the "B"-side. Mondur PF, a modified MDI, was used as the "A"-side. For these tests, only one side of the mold was sprayed with a wax-based external mold release (EMR). When the IMR composition was Example 10 (PO, Armeen DM18D, and stearic acid) fifteen consecutive successful releases were obtained. An IMR composition (Example 18) prepared from Epodil 748, triethylenediamine and stearic acid, however, gave unacceptable release after just five cycles.

EXAMPLE 20

A 1-gallon tin-coated can was charged with 695.3 g of dimethyl stearylamine (Anneen DM18D, 2.28 equivalents) and 648.4 g of stearic acid (Aldrich, 2.28 equivalents). The mixture was melted at 70° C. with stirring and 656.1 g of the glycidyl ether of lauryl alcohol (Epodil 748, 2.28 equivalents) was added. The mixture was stirred while heating on a hot plate at 75°–80° C. Within 2.5 hours, the infrared absorption band at 915 cm$^{-1}$, which is attributed to the epoxide moiety, had disappeared. The material was then stored at 49° C. for 50 hours to insure complete reaction. When cool, the product was a soft yellowish wax. This product afforded 9 consecutive successful releases in a RIM system from a mold coated with a wax external mold release (EMR). A control without IMR gave 3 releases.

EXAMPLE 21

A 1-gallon tin-coated can was charged with 840.5 g of dimethyl stearylamine (Armeen DM18D, 2.76 equivalents), 783.5 g of stearic acid (Aldrich, 2.75 equivalents) and 379.4 g of the bis-glycidyl ether of neopentyl glycol (Epodil 749, 2.76 equivalents). The mixture was heated at 75° C. with stirring for 2.75 hours, by which time the reaction appeared to be complete. The material was then stored at 49° C. for 50 hours to insure complete reaction. When cool, the product was a soft yellowish wax. This product afforded 7 consecutive successful releases in a RIM system from a mold coated with wax EMR.

EXAMPLE 22

The RIM machine was also used to evaluate IMR candidates by measuring consecutive releases from the bare Al mold surface. A series of IMR candidates were evaluated as external mold releases in a pass/fail test. Five consecutive successful releases from one application of the material constituted a successful trial and the candidate then warrants further investigation. The IMR composition of Example 20 showed acceptable performance.

STATEMENT OF INDUSTRIAL APPLICATION

An internal mold release composition is provided for making reaction injection molded polyurethane and polyurethane/urea articles.

We claim:

1. In a polyol containing B-side composition for reaction with a polyisocyanate-containing A-side composition to make a polyurethane or polyurethane/urea elastomer by reaction injected molding, the improvement which comprises a mold release composition which is the reaction product of a $C_{12}-C_{36}$ fatty acid, a tertiary amine having at least one $C_{12}-C_{18}$ alkyl substituent and a $C_2-C_{21}$ reactive epoxide.

2. The B-side composition of claim 1 in which the fatty acid is a saturated $C_{16}-C_{18}$ monocarboxylic acid.

3. The B-side composition of claim 1 in which the fatty acid is stearic, oleic or montanic acid.

4. The B-side composition of claim 1 in which the tertiary amine has the formula

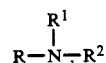

where:
R is $C_1-C_4$ alkyl group,
$R^1$ is a $C_{12}-C_{18}$ hydrocarbyl group, and
$R^2$ is R or $R^1$.

5. The B-side composition of claim 4 in which $R^1$ is lauryl, myristyl, cetyl or stearyl.

6. The B-side composition of claim 4 in which R is methyl and $R^1$ is lauryl or stearyl.

7. The B-side composition of claim 1 in which the epoxide is propylene oxide, monoglycidyl ether of a $C_{12}-C_{18}$ alcohol, or bis-glycidyl ether of neopentyl alcohol.

8. The B-side composition of claim 1 in which the epoxide is monoglycidyl ether of lauryl alcohol.

9. In a polyol containing B-side composition for reaction with a polyisocyanate-containing A-side composition to make a polyurethane or polyurethane/urea elastomer by reaction injected molding, the improvement which comprises a mold release composition which is the reaction product of stearic, oleic or montanic acid, a tertiary amine having the following formula

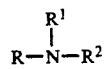

where:
R is $C_1-C_4$ alkyl group,
$R^1$ is a $C_{12}-C_{18}$ hydrocarbyl group, and
$R^2$ is R or $R^1$,
and a reactive epoxide which is propylene oxide or monoglycidyl ether of a $C_{12}-C_{18}$ alcohol.

10. The B-side composition of claim 9 in which $R^1$ is lauryl, myristyl, cetyl or stearyl.

11. The B-side composition of claim 9 in which R is methyl and $R^1$ is lauryl or stearyl.

12. The B-side composition of claim 9 in which the epoxide is monoglycidyl ether of lauryl alcohol.

13. An internal mold release composition which is the reaction product of a $C_{12}$-$C_{36}$ fatty acid, a tertiary amine having at least one $C_{12}$-$C_{18}$ alkyl substituent and a $C_2$-$C_{21}$ reactive epoxide.

14. The internal mold release composition of claim 13 in which the fatty acid is stearic, oleic or montanic acid.

15. The internal mold release composition of claim 13 in which the tertiary amine has the formula

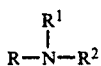

where:
R is $C_1$-$C_4$ alkyl group,
$R^1$ is a $C_{12}$-$C_{18}$ hydrocarbyl group, and
$R^2$ is R or $R^1$.

16. The internal mold release composition of claim 15 in which $R^1$ is lauryl, myristyl, cetyl or stearyl.

17. The internal mold release composition of claim 15 in which R is methyl and $R^1$ is lauryl or stearyl.

18. The internal mold release composition of claim 13 in which the epoxide is propylene oxide or monoglycidyl ether of a $C_{12}$-$C_{18}$ alcohol.

19. The internal mold release composition of claim 13 in which the epoxide is monoglycidyl ether of lauryl alcohol.

20. An internal mold release composition which is the reaction product of stearic, oleic or montanic acid, a tertiary amine having the following formula

where:
R is $C_1$-$C_4$ alkyl group,
$R^1$ is a $C_{12}$-$C_{18}$ hydrocarbyl group, and
$R^2$ is R or $R^1$,
and a reactive epoxide which is propylene oxide or monoglycidyl ether of a $C_{12}$-$C_{18}$ alcohol.

* * * * *